United States Patent [19]
Goodman et al.

[11] Patent Number: 5,665,145
[45] Date of Patent: Sep. 9, 1997

[54] AIR FILTER CHANNEL AND PULLER

[75] Inventors: Doyle R. Goodman, Clarksville; James A. Davis, Franklin, both of Tenn.

[73] Assignee: American Standard Inc., Piscataway, N.J.

[21] Appl. No.: 548,629

[22] Filed: Oct. 26, 1995

[51] Int. Cl.⁶ .................................................. B01D 46/10
[52] U.S. Cl. ........................... 95/273; 55/481; 55/483; 55/506; 95/286
[58] Field of Search ........................... 55/481, 506, 483, 55/484, 422; 95/273, 277, 278, 291, 286

[56] References Cited

U.S. PATENT DOCUMENTS

| | | | |
|---|---|---|---|
| 1,436,569 | 11/1922 | Boerum | 55/481 |
| 1,521,576 | 12/1924 | Wittemeier | 55/506 |
| 3,630,008 | 12/1971 | Revell et al. | 55/502 |
| 4,124,361 | 11/1978 | Revell | 55/484 |
| 4,198,221 | 4/1980 | Catlin et al. | 55/481 |
| 4,251,245 | 2/1981 | Reynolds | 55/481 |
| 4,682,993 | 7/1987 | Todd et al. | 55/481 |

*Primary Examiner*—Jay H. Woo
*Assistant Examiner*—Duane S. Smith
*Attorney, Agent, or Firm*—William J. Beres; William O'Driscoll; Peter D. Ferguson

[57] ABSTRACT

The present invention is directed to improvements in servicing the air filters in air conditioning units such as rooftop air conditioning units. More specifically, the invention is directed to an air filter channel and puller which facilitate the removal of rows of filters.

5 Claims, 3 Drawing Sheets

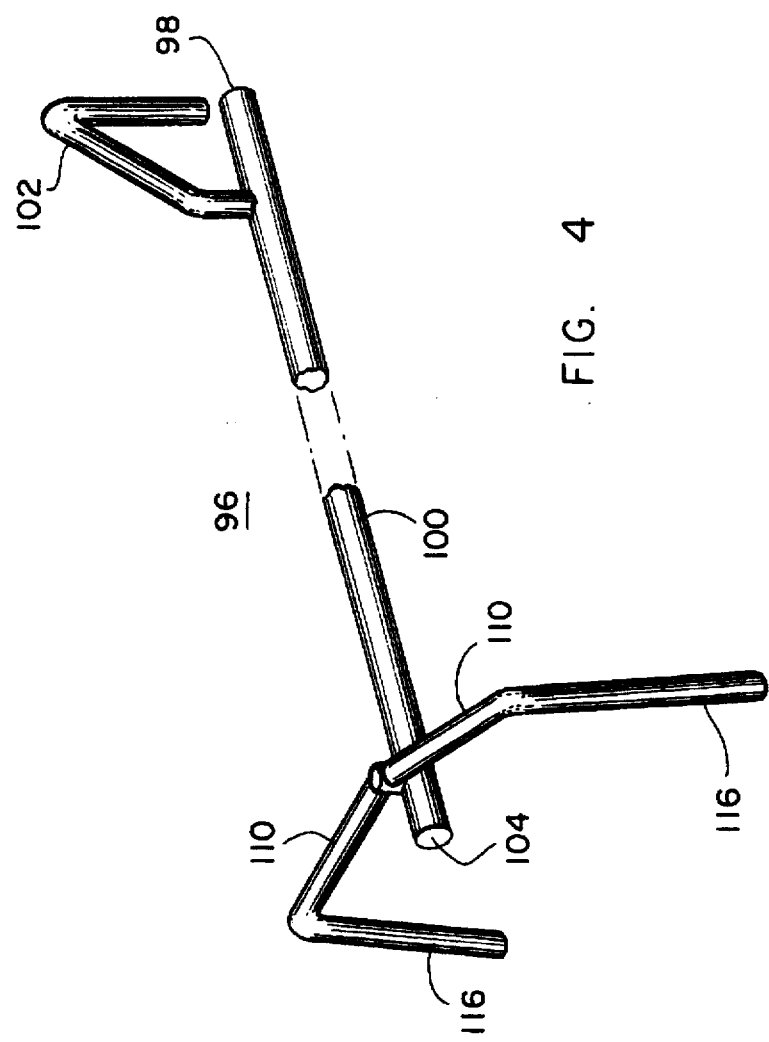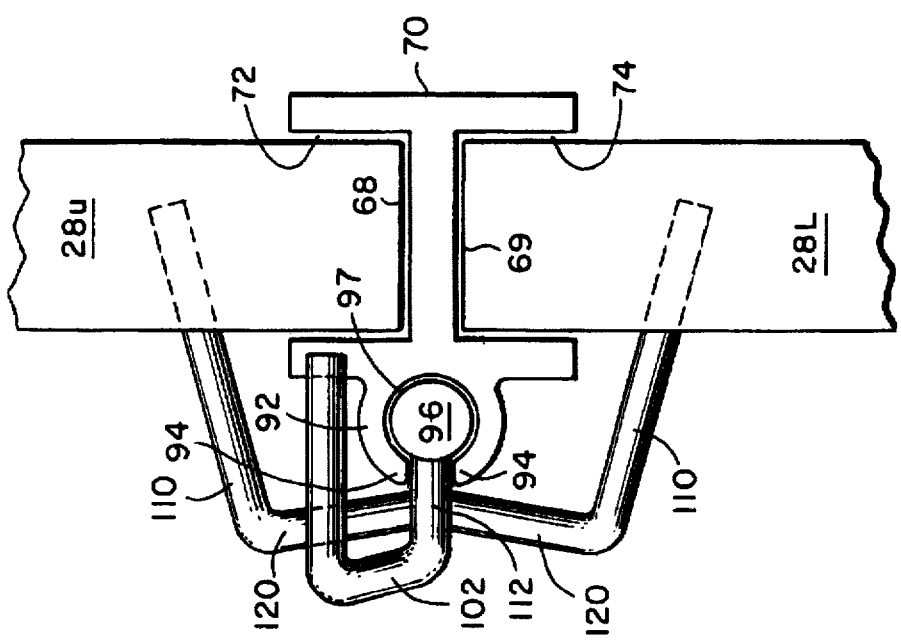

AIR FILTER CHANNEL AND PULLER

BACKGROUND OF THE INVENTION

The present invention is directed to improvements in servicing the air filters in air conditioning units such as rooftop air conditioning units. More specifically, the invention is directed to an air filter channel and puller which facilitate the removal of rows of filters.

As air conditioning rooftop units have grown larger, the serviceman maintaining these units has had a more difficult time removing the air conditioning filters from the airside system. In many of the larger systems these filters are disposed in upper and lower rows supported by a rack and extending much as twelve, fourteen or sixteen feet from side-to-side. The serviceman can typically reach the first one or two filters in each row from a side access door but has a very difficult time extracting the remaining filters in each row.

SUMMARY OF THE INVENTION

The present invention provides a channel and puller for facilitating the removal of air conditioning filters when in rows.

It is an object, feature and advantage of the present invention to provide a puller having a handle and prongs longitudinally separated by a rod or a bar. The rod or bar is long enough to reach the distal end of the farthest filter in each row whereby the prongs engage the far end of each filter and pull both rows forward simultaneously for removal and replacement.

It is a further object, feature and advantage of the present invention to provide a channel to guide and retain the puller where the channel is preferably an integral part of the rack supporting the rows of filters.

The present invention provides a method of removing filters from the filter supporting rack of an air conditioning unit. The method comprises the steps of: forming an intermediate channel on a rack where the intermediate channel longitudinally extends in a direction generally parallel to a row of filters; inserting a puller into the intermediate channel; causing prongs on a distal end of the puller to engage the distal end of each filter row; and removing the puller from the intermediate channel thereby removing the filters in each filter row.

The present invention also provides a filter rack. The filter rack comprises: a frame having an upper filter supporting portion, a lower filter supporting portion, and a frame section separating the upper and lower filter supporting portions. The frame section includes an upper channel forming a bottom piece of the upper filter supporting portion, a lower channel forming a top piece of the lower filter supporting portion, and an intermediate longitudinally extending channel disposed generally perpendicular to a plane encompassing the upper and lower filter supporting portions. The intermediate channel is adapted to retain a longitudinal piece as the longitudinal piece slides in the intermediate channel.

The present invention further provides a filter puller. The filter puller comprises: a longitudinal body; a distal end of the longitudinal body having a filter engaging mechanism; and a proximal end of the longitudinal body having a handle.

BRIEF DESCRIPTION OF THE DRAWINGS

FIG. 3 is a section of FIG. 2 showing the channel and puller of the present invention.

FIG. 4 is a perspective view of the puller of the present invention.

DETAILED DESCRIPTION OF THE DRAWINGS

Figure 1:
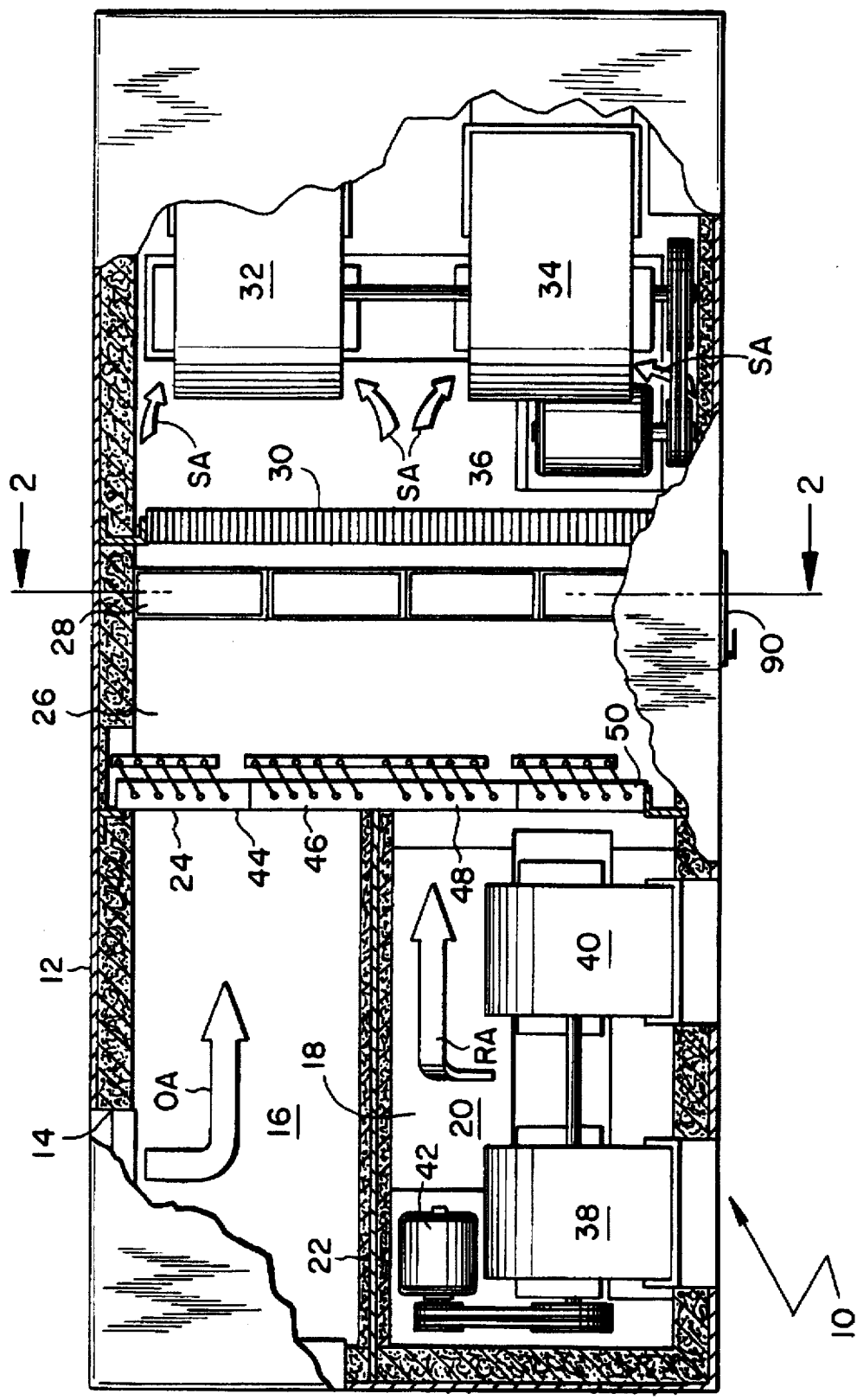
FIG. 1 is a top perspective view of a rooftop air conditioning unit in accordance with the present invention with a portion of the exterior housing broken away to reveal the inner mechanisms of the system.

Referring to FIG. 1, air conditioning unit 10 includes a sheet metal housing 12 of generally rectangular configuration adapted for mounting on the roof of a building. The housing 12 includes an outside air inlet opening 14 which leads into an outside air chamber 16. The flow of the outside air is indicated in FIG. 1 by an arrow OA.

A return air opening 18 in the bottom wall of housing 12 is in flow communication with the return air duct work from the building being served. The return air opening 18 opens into a return air chamber 20. The return air chamber 20 and the outside air chamber 16 are separated by fluid tight partition 22. Return air flows upward through the return air opening 18 into the return air chamber 20 as indicated by an arrow RA. The outside air chamber 16 is separated from the return air chamber 20 by the partition 22. FIG. 1 illustrates the side by side arrangement of outside air and return air that is favored in the design of VAV type air conditioning apparatus 10.

The flow of outside air and return air through the air conditioning apparatus 10 is controlled by a damper assembly 24. Flow is through a plenum 26 and into filters 28. After filtration the air flows past a heat exchange coil 30. The heat exchange coil 30 is to provide for conditioning the air flowing past it.

The outside and return air, after being conditioned by passing through the filters 28 and the heat exchange coil 30, is directed by fans 32, 34 downward into the supply air ducts (not shown) of the building being served. The conditioned air constitutes what is known as supply air and is indicated by arrows designated SA entering the sides of the fans 32, 34. The fans 32, 34 are driven in a common manner by an electric motor 36. The fans 32, 34 force the supply air downward through the supply ducts (not shown) into the cooling zones of the building being served.

Exhaust fans 38, 40 are operated when it is necessary to exhaust a large quantity of return air to the outside ambient air. The exhaust fans 38, 40 are driven in a common manner by an electric motor 42.

The damper assembly 24 is preferably comprised of four distinct damper groups, but in practice has been implemented using three distinct operational damper groups. The flow of outside air is controlled by an outer outside air damper 44 and an inner outside air damper 46. The flow of return air is controlled by an inner return air damper 48 and an outer return air damper 50. The operation of each of the air damper groups 44, 46, 48 and 50 that comprise damper assembly 24 is such that the inner outside air damper 46 and the inner return air damper 48 are controlled as a unit and the outer outside air damper 44 and the outer return air damper 50 are controlled as a unit.

The general theory of operation of air conditioning apparatus of this type is well known to those skilled in the art. Accordingly, no further description is believed warranted, and the discussion now turns to a description of the novel assembly comprising the applicant's invention.

Figure 2:
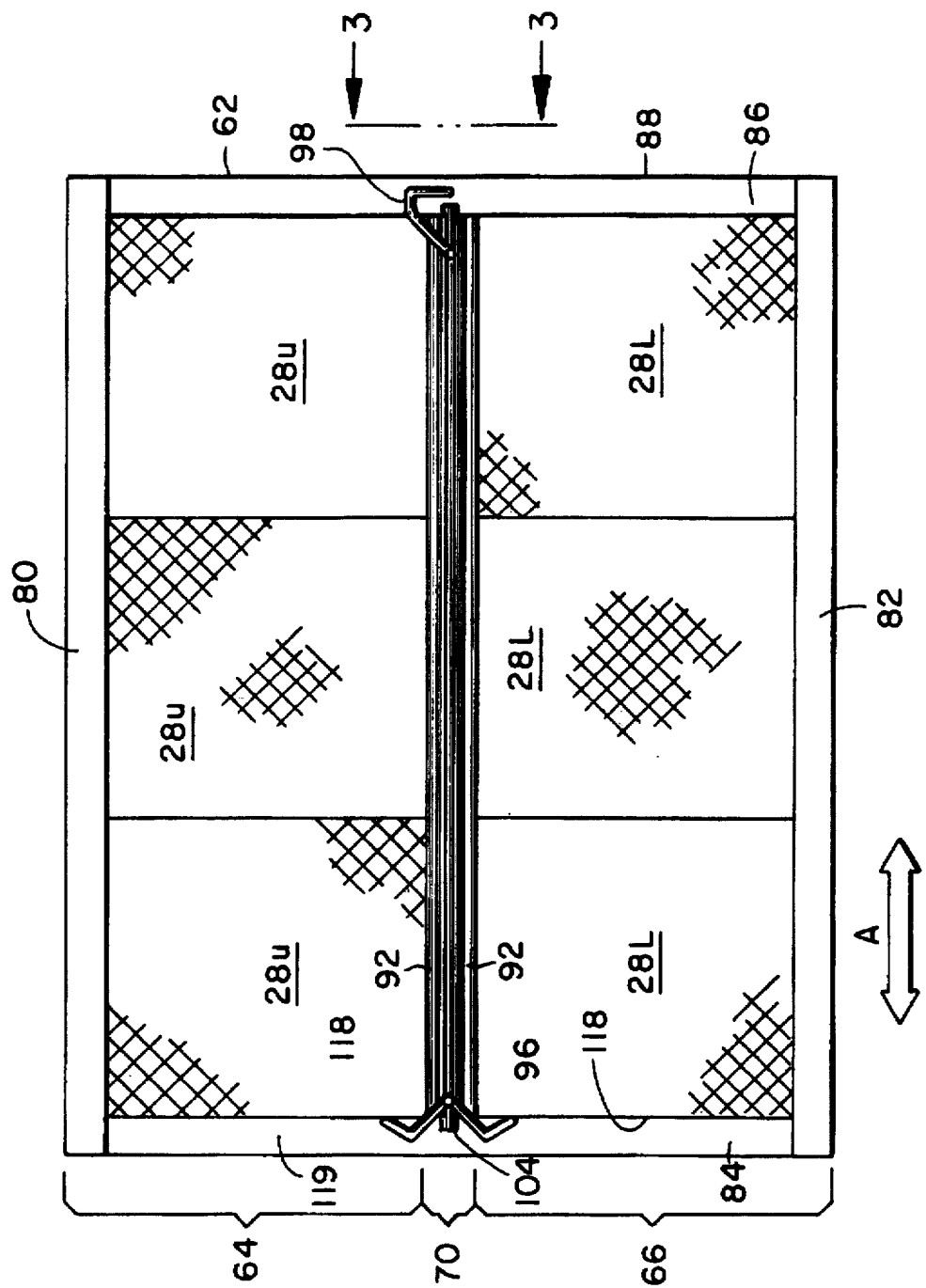
FIG. 2 is a cutaway of FIG. 1 showing the filter rack, channel and puller of the present invention.

As shown in FIG. 2, the filters 28 are supported by a rack 60. The rack 60 has a frame 62 including an upper filter supporting portion 64 and a lower filter supporting portion 66. Each of the upper and lower filter supporting portions 64, 66 supports a row of filters 28U, 28L respectively.

The upper filter supporting portion 64 is separated from the lower filter supporting portion 66 by a frame section 70. The frame section 70 includes a U-shaped upper channel 72 and a U-shaped lower channel 74 (best seen in FIG. 3). The upper and lower channels 72, 74 extend longitudinally in the plane of the filters 28. The U-shaped upper channel 72 supports the bottom 68 of the filters in the upper row 28U, while the U-shaped lower channel 74 supports the top 69 of the filters in the lower row 28L. The upper filter supporting portion 64 includes this upper channel 72 and includes an upper frame piece 80 having a channel similar to that of the lower channel 74 but supporting the top of upper row of filters 28U. Similarly, the lower filter supporting portion 66 has a lower frame section 82 having a channel similar to the upper channel 72 for supporting the bottom of the filters in the lower row 28L. End supports 84 and 86 unite the frame section 70 with the upper frame section 80 and the lower frame sections 82 into the filter rack 60.

Each of the channels 72, 74 are open to the proximal end 88 of the frame 60 to allow filters to be added or removed through an access door 90. The frame section 70 includes an intermediate longitudinally extending channel 92 which is open at the proximal end 88 of the filter rack 60. The intermediate channel 92 is preferably extruded from the frame section 70 itself in direction generally perpendicular to the plane B (FIG. 1) of the filters 28 and extends in a direction A generally longitudinally parallel to the filters 28. In the preferred embodiment, the intermediate channel 92 includes extensions 94 adapted to engage and retain a puller 96 as the puller 96 slides back and forth in the intermediate channel 92 in the directions A of FIG. 2. The puller 96 has a body 100 and is preferably formed of a fairly rigid metal such as iron, steel or aluminum. The body 100 is surrounded by a sleeve 97 formed of plastic or some other material which facilitates sliding in the intermediate channel 92. The sleeve 97 extends generally the length of the body 100 of the puller 96 and is sized to slideably retain the puller 96 in the intermediate channel 92. A proximal end 98 of the puller 96 includes a handle 102 which allows a serviceman to slideably push and pull the puller 96 through the intermediate channel 92. At a distal end 104 of the puller 96, the puller 96 includes a filter engaging mechanism such as prongs 110. The prongs 110 and the handle 102 project through a longitudinally extending gap 112 in the intermediate channel 92. The gap 112 is formed and located between the extensions 94. The prongs 110 extend from the distal end 104 of the puller 96 in a direction away from the proximal end 98. The prongs 110 include tines 116 adapted to engage a distal end 118 of the upper and lower rows of air conditioning filters 28U, 28L. The prongs 110 also include extender portions 120 between the tines 116 and the body 100. The expander portions 120 spread the tines 116 externally of the upper and lower channels 72, 74 at an angle approaching 90° of a line through the body 100. Preferably, the tines 116 slant slightly back towards the proximal end 98 so that the tines 116 do not engage or snag on the filters 28 while being inserted into the proximal end 98 of the intermediate channel 92.

A serviceman can insert the puller 96 into the intermediate channel 92 from the proximal end 98, slide the prongs 110 to the far end 119 of the upper and lower filter rows 28U, 28L, engage the distal end 118 of those upper and lower filters 28U, 28L with the tines 116 and pull the handle 102 toward the proximal end 98 so as to thereby remove the entire upper and lower filter rows 28U, 28L.

The present invention has described a method and apparatus for facilitating the removal of rows of filters. The present invention contemplates various modifications and alterations of the method and apparatus including changing the cross sectional shape of the filter puller from a rod to a square or rectangular bar or other manufacturable polygonal shape. In such case the internal cross sectional shape of the intermediate channel 92 would be similarly modified. Various numbers and shapes of the prongs 110 are also contemplated as are modifications and alterations in the shape of the handle 102. Additionally, while the intermediate channel 92 is preferably extruded from the frame section 70, it could also be welded, brazed, or fastened by fasteners such as screws, bolts or glue. Additionally, the material of the puller 96 can be varied to include other suitable materials such as fiberglass or plastics. Additionally, the puller 96 could include a single prong 120 adapted to remove a single row of filters. All such modifications are contemplated to be within the spirit and scope of the claims.

Applicant claims the following for Letters Patent of the United States:

1. A method of removing filters from the filter supporting rack of an air conditioning unit comprising the steps of:

forming an intermediate channel on a rack where the intermediate channel longitudinally extends in a direction generally parallel to a row of filters;

inserting a puller into the intermediate channel;

causing prongs on a distal end of the puller to engage the distal end of a filter row; and removing the puller from the intermediate channel thereby removing the filters in a filter row.

2. The method of claim 1 including adapting the prong to avoid engagement upon insertion and encourage engagement upon removal of the puller.

3. The method of claim 2 including providing a sleeve around the puller to facilitate slideable engagement with the intermediate channel.

4. The method of claim 3 wherein the forming step includes the further step of providing a unitary piece including an upper channel supporting a filter row, a lower channel supporting a filter row, and the intermediate channel;

wherein the causing step includes the step of engaging the distal ends of both the lower and the upper filter rows; and wherein the removing step includes the further step of removing the filters in both the upper and the lower filter rows at the same time.

5. The method of claim 1 wherein the forming step includes the further step of extruding the intermediate channel in a direction generally perpendicular to a plane of the filters.

* * * * *